United States Patent
Knicker et al.

(10) Patent No.: US 7,405,507 B2
(45) Date of Patent: Jul. 29, 2008

(54) METHOD AND DEVICE FOR OPERATING AN ACTUATOR WITH A CAPACITIVE ELEMENT

(75) Inventors: Rainer Knicker, Remseck Am Neckar (DE); Udo Schulz, Vaihingen/Enz (DE); Andreas Huber, Steinheim (DE); Johannes-Joerg Rueger, Vienna (AT)

(73) Assignee: Robert Bosch GmbH, Stuttgart (DE)

( * ) Notice: Subject to any disclaimer, the term of this patent is extended or adjusted under 35 U.S.C. 154(b) by 338 days.

(21) Appl. No.: 10/524,129

(22) PCT Filed: Jun. 30, 2003

(86) PCT No.: PCT/DE03/02172

§ 371 (c)(1),
(2), (4) Date: Sep. 26, 2005

(87) PCT Pub. No.: WO2004/018860

PCT Pub. Date: Mar. 4, 2004

(65) Prior Publication Data

US 2006/0112935 A1      Jun. 1, 2006

(30) Foreign Application Priority Data

Aug. 10, 2002   (DE)   ................. 102 36 819

(51) Int. Cl.
*H01L 41/08*      (2006.01)

(52) U.S. Cl. .......................... 310/316.01; 310/316.03
(58) Field of Classification Search ............ 310/316.01, 310/317, 319, 323.01
See application file for complete search history.

(56) References Cited

U.S. PATENT DOCUMENTS

2001/0015577 A1* 8/2001 Rueger et al. ............... 307/109
2002/0030418 A1* 3/2002 Rueger et al. ........... 310/316.01

FOREIGN PATENT DOCUMENTS

| DE | 198 54 306 | 6/2000 |
|---|---|---|
| DE | 199 58 406 | 6/2001 |
| EP | 1 138 905 | 10/2001 |
| EP | 1 139 445 | 10/2001 |

\* cited by examiner

*Primary Examiner*—Mark Budd
(74) *Attorney, Agent, or Firm*—Kenyon & Kenyon LLP

(57) ABSTRACT

A positioner includes a capacitative element with which an ohmic resistance is connected in parallel. The value of the ohmic resistance is sensed at specific points in time. To enhance operating reliability during operation of the positioner, correct functioning of the ohmic resistance is monitored, and a fault signal is outputted upon detection of a malfunction.

15 Claims, 4 Drawing Sheets

METHOD AND DEVICE FOR OPERATING AN ACTUATOR WITH A CAPACITIVE ELEMENT

RELATED APPLICATIONS

This application is a 371 of PCT/DE 03/02172 filed on Jun. 30, 2003.

FIELD OF THE INVENTION

The present invention relates to a method for operating an actuator having a capacitative element, an ohmic resistance being connected in parallel with the capacitative element and the value of the ohmic resistance being sensed at specific points in time.

BACKGROUND INFORMATION

A method is referred to in Published Patent Application No. DE 199 58 406 A1, which describes a piezoactuator that is used, for example, in a fuel injector. The piezoactuator behaves similarly to a capacitative element in electrical terms, and is therefore itself often referred to as a capacitative element. The capacitative element is longer or shorter depending on its charge state. The change in length of the capacitative element is transferred to a valve element of the fuel injector.

In the event of an interruption in activation of the capacitative element, or a malfunction of one of the components, it may happen that the capacitative positioner remains continuously in one specific position because it can no longer be discharged. In a context of use in a fuel injector, the result of this may be, for example, that the latter remains in the open position for a long period of time, and fuel is continuously injected into the combustion chamber of the internal combustion engine. This may result in severe damage to the internal combustion engine.

The ohmic resistance is provided to prevent such a situation. It enables discharging of the capacitative element even when the actual control line is interrupted, e.g. due to a cable break or a contact fault. The value of the ohmic resistance is dimensioned such that the time constant resulting from the capacitative element and the ohmic resistance is so great that no significant discharge of the capacitative element occurs within the usual activation time period that is usual for fault-free injection. On the other hand, the time constant is set so that the capacitative element is sufficiently discharged within the maximum time available before the valve must definitely be closed in order not to damage the internal combustion engine.

German Published Patent Application No. 199 58 406 proposes to sense the value of the ohmic resistance at specific points in time, and to draw conclusions therefrom as to the nature and/or the temperature of the capacitative element. The temperature dependence of the capacitative element may thereby be corrected.

SUMMARY OF THE INVENTION

The present invention may enhance operating reliability when a capacitative element is used.

This may be achieved, in the context of a method of the kind cited initially, in that correct functioning of the ohmic resistance is monitored, and a fault signal is outputted upon detection of a malfunction.

An exemplary method according to the present invention may monitor the functionality of the ohmic resistance representing a safety device in order to detect states in which that safety device can no longer perform the function assigned to it. This in turn may make it possible, for example, to seek out in timely fashion a maintenance facility that can repair the safety device, i.e. the ohmic resistance, and thus restore the operating reliability of, for example, an internal combustion engine.

In a first exemplary embodiment, the value of the ohmic resistance may be sensed and compared with a limit value. A corresponding exemplary method for sensing the value of the ohmic resistance is described in German Published Patent Application No. 199 58 406. Sensing the value of the ohmic resistance and comparing the sensed value with a limit value may be simple and reliable capability for checking the functionality of the ohmic resistance. This is because if the ohmic resistance loses contact with the capacitative element, e.g. as a result of a poor solder joint, the value of the ohmic resistance rises sharply. This may be unequivocally detected by way of the claimed comparison with a limit value. It may also be possible to monitor whether the value of the ohmic resistance is within a tolerance band.

In another exemplary embodiment, the value of the ohmic resistance may be sensed during a startup phase of a control unit with which the capacitative element is activated, and/or during a shutdown phase of the control unit when the latter is being switched off. The above-claimed sensing of the value of the ohmic resistance may not be possible in every case during normal operation of the capacitative element. This is because in order to sense the value of the ohmic resistance (in accordance with the exemplary method indicated in German Published Patent Application No. 199 58 406), it may be necessary to charge the capacitative element to a certain voltage and to sense the discharge curve through the ohmic resistance. A sufficiently high voltage may be important in this context, since the error may become too great at excessively low voltages. This may not be achievable during normal operation of the capacitative element.

Prior to actual operation of the capacitative element, however, there exist a startup phase of the control unit that activates the capacitative element. During this startup phase of the control unit, for example, a self-test may be executed and certain initial values are set. The same also applies to the shutdown phase of the control unit, which may be necessary for controlled shutoff of the capacitative element and of the device in which the capacitative element is being used. During these phases, the capacitative element is not yet being used as intended, so that charging and discharging for test purposes produce no interference here.

The capacitative element may be used in an injector of an internal combustion engine, and the value of the ohmic resistance may be sensed during a coasting mode of the internal combustion engine. No fuel is usually injected into the internal combustion engine while the internal combustion engine is in coasting mode. It may therefore be appropriate to use this operating state in order to sense the value of the ohmic resistance.

In an exemplary embodiment of a method according to the present invention, correct functioning of the capacitative element may be monitored. A corresponding exemplary method therefore is described in European Patent Application No. 1 138 905. With this exemplary method according to the present invention, therefore, on the one hand correct functioning of the capacitative element may be monitored, i.e. a determination may be made as to whether activation from the control unit to the capacitative element is OK (cable break, loose connector, etc.); and on the other hand, correct functioning of the ohmic resistance, i.e. the safety device of the capacitative element, may be monitored. A high level of safety may thus be achieved with this exemplary embodiment of the method according to the present invention.

According to an exemplary embodiment, a first fault signal may be outputted when it is determined that the ohmic resistance is working correctly and the capacitative element not correctly, or when it is determined that the capacitative element is working correctly and the ohmic resistance not correctly. The user of the capacitative element may be, in this fashion, given concrete information regarding that specific malfunction. He or she may thus react accordingly, i.e. seek out a maintenance facility.

In this context, the capacitative element may be used in an injector of an internal combustion engine, and the first fault signal may cause a reduction in the maximum permitted torque of the internal combustion engine. The internal combustion engine is thus shifted into a "safety mode" in which it may continue to be operated, but only in such a manner that no permanent damage to the internal combustion engine occurs.

In this context a second fault signal may be outputted when it is determined that on the one hand the ohmic resistance and on the other hand the capacitative element are not working correctly. The result is to create a graduated fault message that informs the user not only of the existence of a malfunction, but also about the nature and severity of the malfunction. The user may thus react to the reported malfunctions in particularly effective and specific fashion. It is understood in this context that the second fault signal indicates a more serious malfunction than the first fault signal. This is because if on the one hand the ohmic resistance and on the other hand the capacitative element are not working correctly, this means that the risk of damage to the apparatus being operated with the capacitative element may be particularly high.

If the capacitative element is used in an injector of an internal combustion engine, the second fault signal should cause the affected cylinder to be shut off, the fuel pressure to be reduced, and/or the internal combustion engine to be shut down. These actions may reduce the risk of permanent damage to the internal combustion engine, or may entirely rule out such a risk.

It may also be desired if the first and/or the second fault signal result(s) in an input into a fault memory and/or the triggering of a specific alarm signal. This may facilitate diagnosis at the maintenance facility and appropriate reaction by the user.

The present invention also relates to a computer program to carry out the aforesaid exemplary method when it is executed on a computer. In this context, the computer program may be stored on a memory, in particular on a flash memory.

The present invention further relates to an open- and/or closed-loop control unit for operating an internal combustion engine. In this context, such an open- and/or closed-loop control unit may encompass a memory on which a computer program of the aforesaid kind is stored.

Also the subject matter of the present invention may include an internal combustion engine having a combustion chamber, having at least one injector that encompasses a capacitative element as actuator and that encompasses an ohmic resistance connected in parallel with the latter. To enhance the operating reliability of the internal combustion engine, it is proposed that it encompass an open- and/or closed-loop control device of the aforesaid kind.

DETAILED DESCRIPTION

Figure 1:
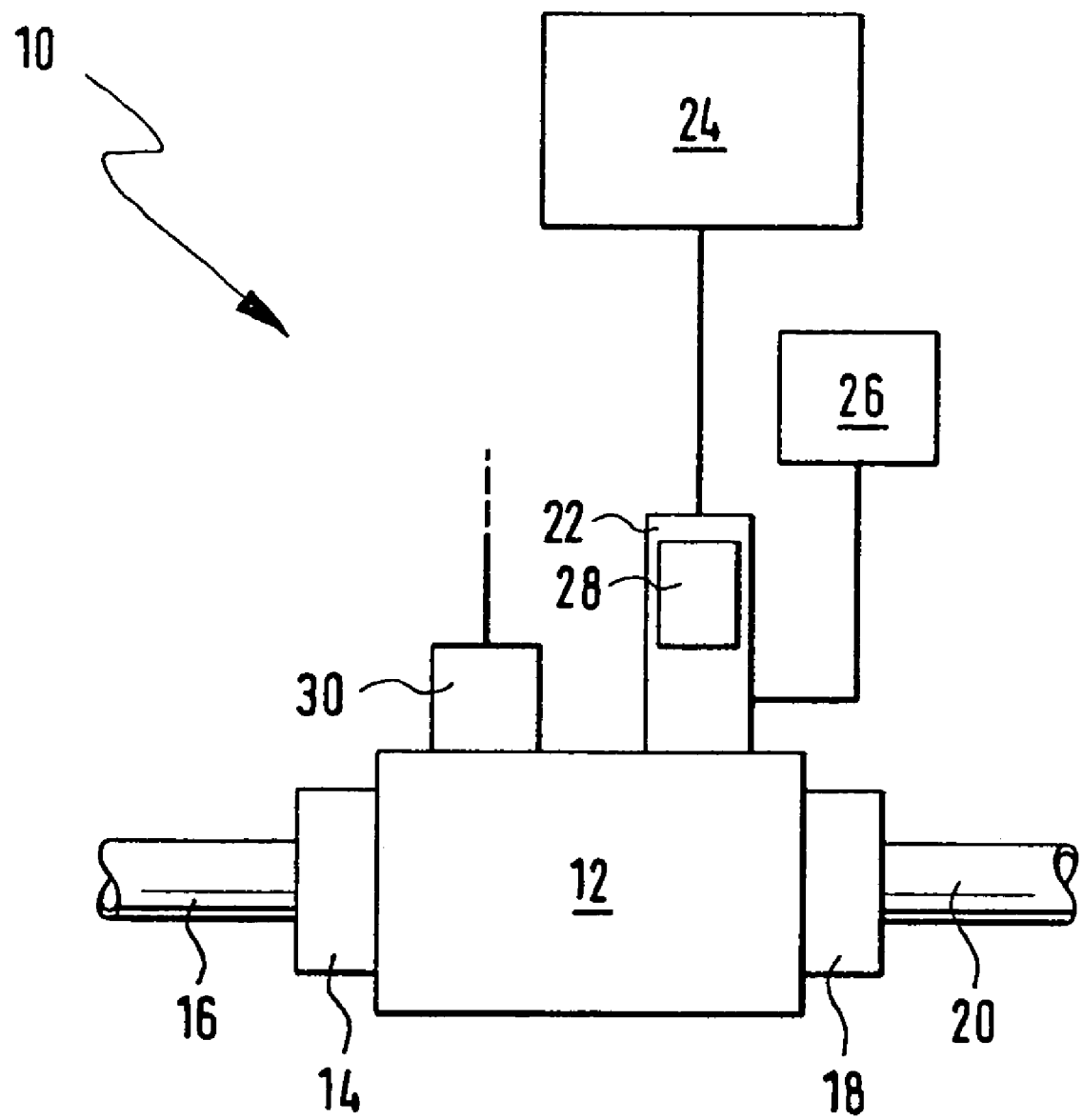
FIG. 1 schematically depicts an internal combustion engine having an injector that encompasses a piezoactuator.

In FIG. 1, an internal combustion bears in its entirety the reference character 10. It encompasses a combustion chamber 12 into which fresh air is introduced through an inlet valve 14 and an intake duct 16. The hot combustion gases are discharged from combustion chamber 12 through an outlet valve 18 and an exhaust duct 20.

Fuel is introduced directly into combustion chamber 12 through an injector 22 that is activated by a control unit 24 and receives fuel under high pressure from a fuel system 26. Injector 22 encompasses a valve needle (not depicted in FIG. 1) that is actuated by a piezoactuator 28. The fuel/air mixture present in combustion chamber 12 after an injection is ignited by a spark plug 30 (note in this context that the use of injector 22 is not confined to gasoline internal combustion engines, but that it may also be used in diesel internal combustion engines).

Figure 2:
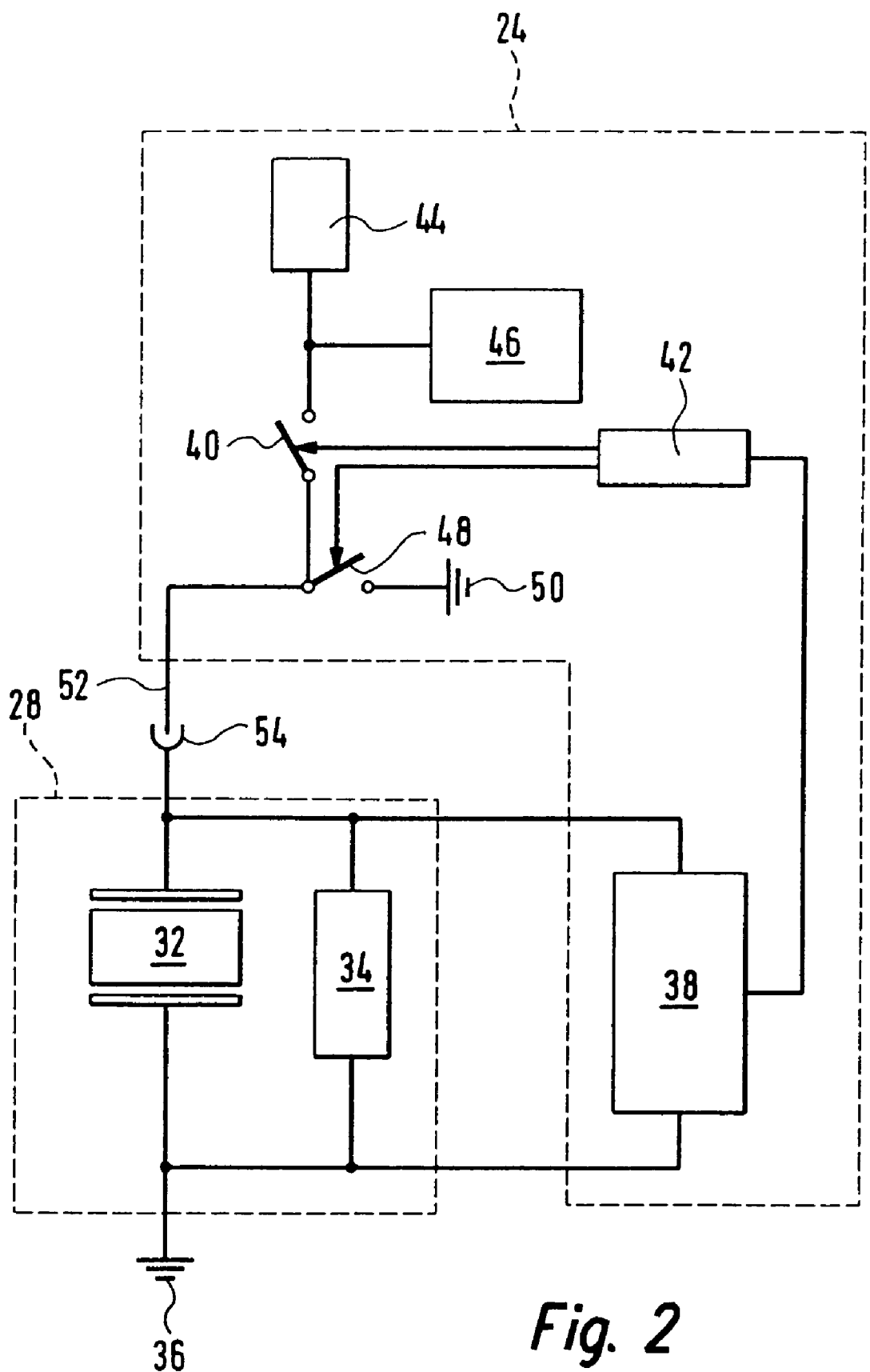
FIG. 2 shows a detail of the piezoactuator of FIG. 1 and a control unit for activating it.

As is evident from FIG. 2, piezoactuator 28 encompasses a multi-layer piezo positioner 32 whose length depends on its electrical charge state. Since a multi-layer piezo positioner of this kind has electrical properties similar to those of a capacitative element, it may also itself be referred to as a capacitative element. An ohmic resistance 34 is connected in parallel with multi-layer piezo positioner 32. Multi-layer piezo positioner 32 and ohmic resistance 34 thus constitute an RC element.

Piezoactuator 28 may be connected, for example via a hydraulic coupler (not depicted), to the valve needle of injector 22, and may influence the position of the valve needle depending on the voltage present at multi-layer piezo positioner 32. In an exemplified embodiment that is not depicted, the piezoactuator actuates a hydraulic control valve that causes a motion of the valve needle by way of a pressure change in a control chamber.

Multi-layer piezo positioner 32 and ohmic resistance 34 are, via their one terminal, on the one hand grounded (reference character 36) and on the other hand connected to an evaluation block 38 that is part of open- and closed-loop control unit 24 and is discussed in greater detail below. At their other terminal, multi-layer piezo positioner 32 and ohmic resistance 34 are on the one hand again connected to evaluation block 38 and on the other hand connected to an output stage switch 40. As once again discussed in detail below, the manner of connection of evaluation block 38 makes it possible to sense, by means thereof, the voltage drop occurring through RC element 32, 34.

Output stage switch 40 is activated by a control block 42 that receives and processes different input signals, also including signals from evaluation block 38. Multi-layer piezo positioner 32 and ohmic resistor 34 can be connected via output stage switch 40 to an energy source 44. Additionally disposed between output stage switch 40 and energy source 44 is a monitoring device 46 whose exact function will once again be discussed in detail below.

Control block 42 additionally activates a further output stage switch 48 that may ground (reference character 50) the other terminal of capacitative element 32 and of ohmic resistance 34. Piezoactuator 28 is connected to open- and closed-loop control unit 24 via a line 52 and a connector 54.

During normal operation of internal combustion engine 10, injector 22 with multi-layer piezo positioner 32 works as follows: When fuel is to be injected by injector 22 into combustion chamber 12 of internal combustion engine 10, first output stage switch 40 is closed by control block 42, and second output stage switch 48 is opened. Multi-layer piezo positioner 32 is thus connected to energy source 44. The voltage now present at capacitative element 32 causes an elongation of the capacitative element which, as already indicated above, causes valve needle of injector 22 to lift off from a corresponding valve seat and open a passage for fuel from fuel source 26 into combustion chamber 12.

When the injection of fuel into combustion chamber 12 is to be terminated, output stage switch 48 is closed by control block 42 (output stage switch 40 having been opened again immediately after the end of the charging operation). Both terminals of multi-layer piezo positioner 32 are thus grounded (reference characters 36 and 50), so that multi-layer piezo positioner 32 discharges again and becomes correspondingly shorter. As a result, the valve needle of injector 22 once again comes into contact against the corresponding valve seat so that communication between fuel system 26 and combustion chamber 12 is again interrupted.

Reliable operation of capacitative element 32 may be important for the overall operating reliability of the internal combustion engine. Without corresponding countermeasures, it may happen that, for example in the event of a break in cable 52 or a loose connector 54, multi-layer piezo positioner 32 is no longer connected to open- and closed-loop control device 24 and thus may no longer be activated. If the connection between multi-layer piezo positioner 32 and open- and closed-loop control device 24 is interrupted while multi-layer piezo positioner 32 is charged, i.e. while an injection of fuel into combustion chamber 12 of internal combustion engine 10 is occurring, then without corresponding countermeasures, that injection may not be terminated. This may result in severe damage to internal combustion engine 10.

To prevent this, ohmic resistance 34 is connected in parallel with multi-layer piezo positioner 32. This resistance is dimensioned so that the time constant resulting from multi-layer piezo positioner 32 and ohmic resistance 34 (which constitute an RC element) is so great that no significant discharge of capacitative element 32 occurs within the usual activation time period that is necessary and usual for a fault-free injection of fuel into combustion chamber 12. On the other hand, the time constant is set so that multi-layer piezo positioner 32 is sufficiently discharged within the maximum time available before injector 22 must definitely be closed in order not to damage internal combustion engine 10. When appropriately dimensioned, ohmic resistor 34 therefore acts as a so-called "bleeder resistance."

Figure 3:
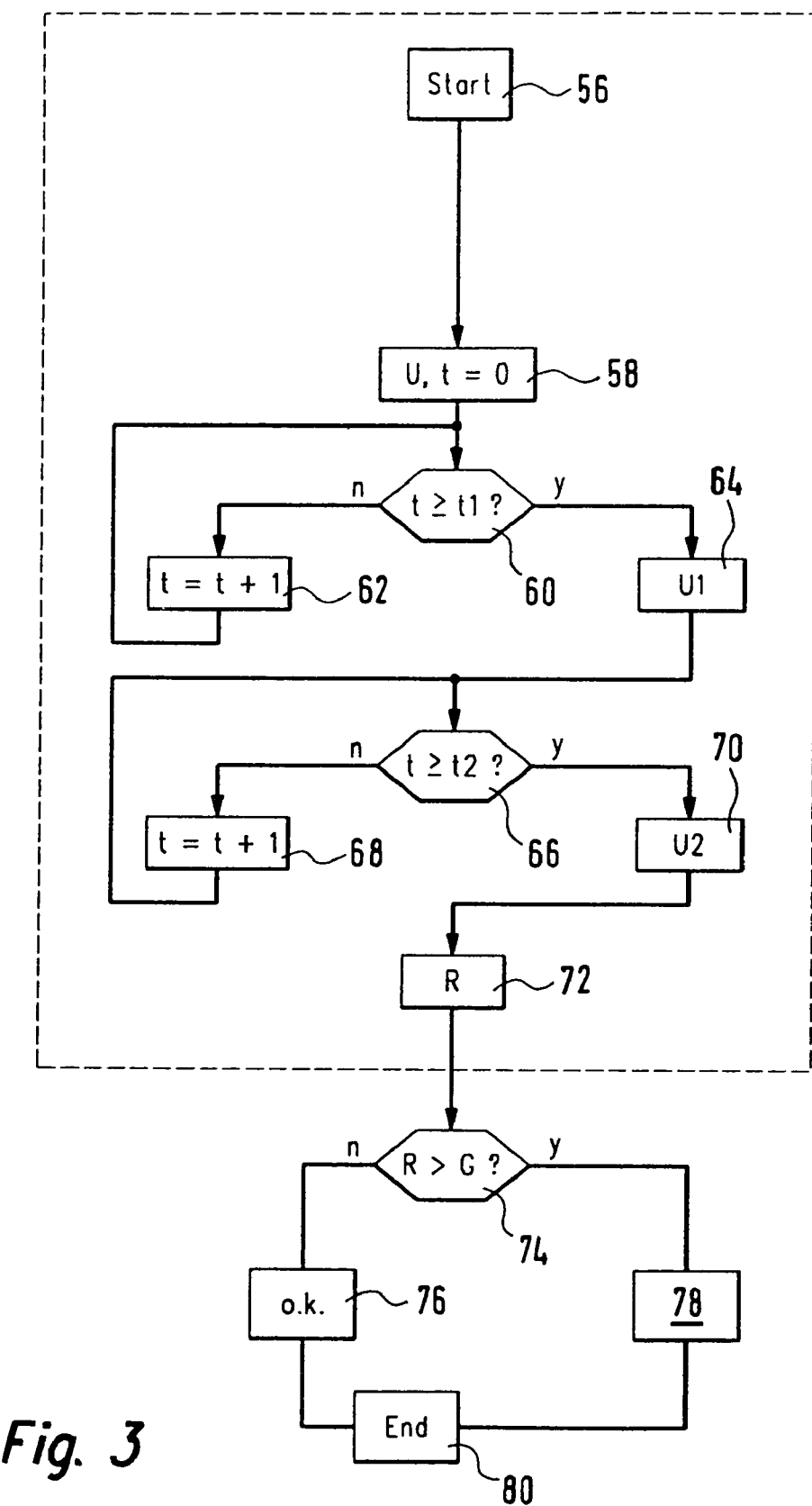
FIG. 3 is a flow chart of an exemplary method operating the piezoactuator of FIG. 1.

If a break in line 52 or a detachment of connector 54 occurs while injector 22 is open, multi-layer piezo positioner 32 is therefore discharged through ohmic resistance 34, and injector 22 is thus closed again. Ohmic resistance 34 is therefore an important safety device of injector 22. The knowledge that this safety device is functional may thus enhance the overall operating reliability of internal combustion engine 10. The functionality of ohmic resistance 34 is determined, during a coasting mode of the internal combustion engine, during startup and during shutdown of open- and closed-loop control device 24, as follows (see FIG. 3):

The exemplary method depicted in FIG. 3 begins with a Start block 56. After this, in block 58 multi-layer piezo positioner 32 is charged to a defined voltage U. Simultaneously, a time counter t is set to zero. The subsequent query in block 60 checks whether the value of time counter t is greater than or equal to a time threshold t1. If that is not the case, the time counter is then incremented in 62, and the query in block 60 is made again. If time counter t is greater than or equal to time threshold t1, the voltage U1 at that time t1 is then measured in block 64.

The next step 66 queries whether the content of time counter t is greater than or equal to a second time threshold t2. If that is not the case, the time counter is then incremented in block 68. If it is the case, the value U2 of the voltage at time t2 is then ascertained in block 70.

The voltage in the RC element constituted by multi-layer piezo positioner 32 and ohmic resistance 34 decreases over time according to an exponential function, the exponential function being determined substantially by a time constant. By measuring voltage U1 at time t1 and voltage U2 at time t2, the time constant may be determined and, if the capacitance of capacitative element 32 is known, therefore the value R of ohmic resistance 34. This calculation of the value R is performed in block 72.

Block 74 then queries whether the value R is greater than a limit value G. If the response to the query in block 74 if No, this indicates that ohmic resistance 34 is working correctly (block 76). If, however, a solder joint with which ohmic resistance 34 is connected to multi-layer piezo positioner 32 is defective, for example, the value R of ohmic resistance 34 rises sharply and exceeds limit value G. In this case the response to the query in 74 is Yes, and that logical signal is further processed in block 78 in a manner depicted below in detail. The checking of the functionality of ohmic resistance 34 ends in an End block 80.

Figure 4:
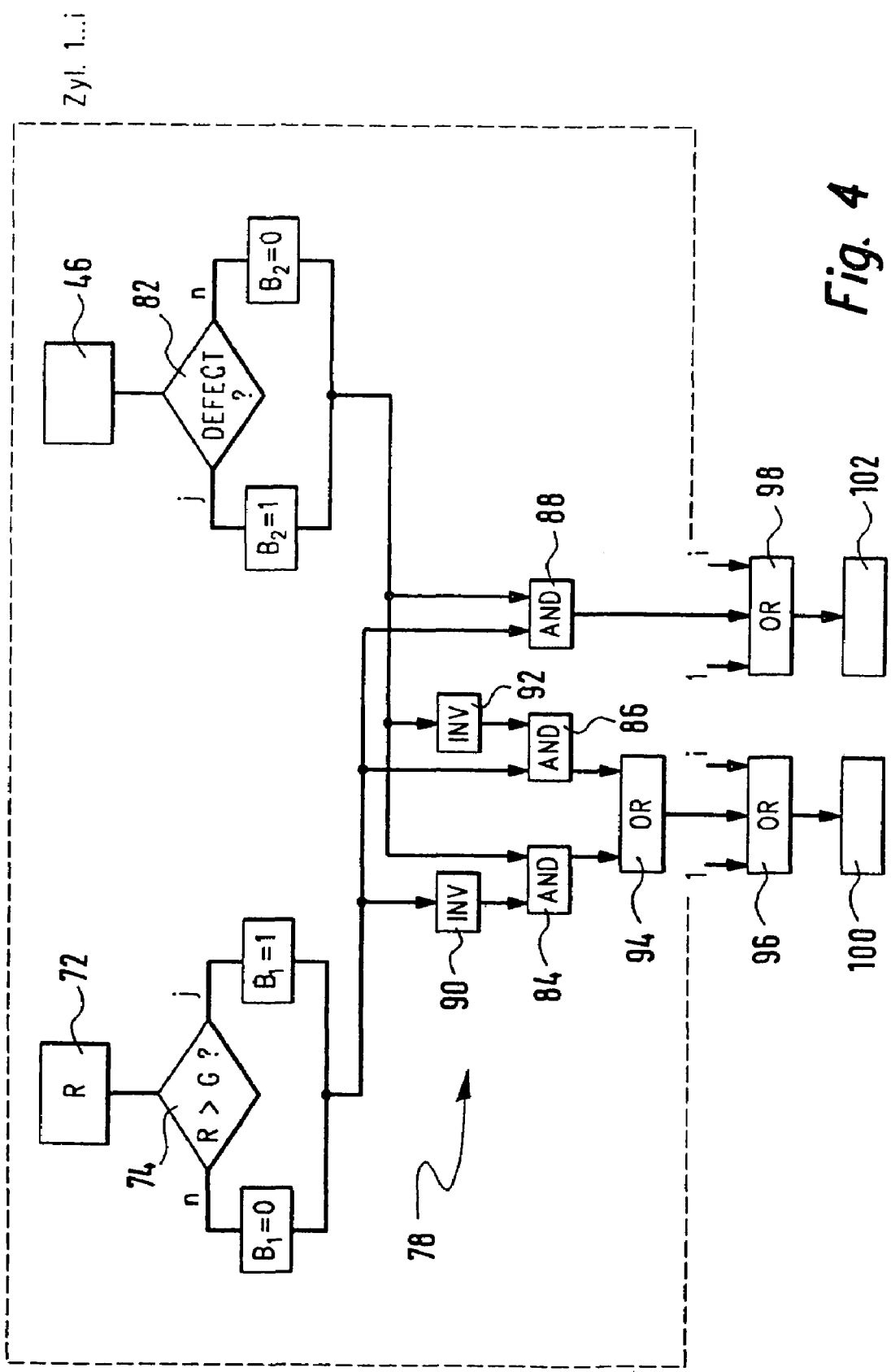
FIG. 4 is a flow chart of a further exemplary method for operating the piezoactuator of FIG. 1.

FIG. 4 depicts the processing in processing block 78 in detail. That processing contains substantially a combination of the logical Yes result of query block 74 with the logical results of the diagnosis of the functionality of capacitative element 32 by way of monitoring block 46 (see FIG. 2). Block 82 queries whether multi-layer piezo positioner 32 is or is not functional. If a defect is present, a bit $B_2=1$ is set at the output of block 82. If no defect is present, bit $B_2=0$ is set at the output of block 82. Analogously, a bit $B_1=1$ is set at the output of query 74 if the value R of ohmic resistance 34 is greater than the limit value G, i.e. if there is a defect in ohmic resistance 34. The same bit $B_1$ is set to zero when ohmic resistance 34 is working in fault-free fashion.

The respective outputs of queries 74 and 82 are fed into three logical AND blocks 84, 86, and 88. The output of query block 74 is inverted in block 90 before being fed into block 84, and the output of query block 82 is inverted in block 92 before being fed into block 86. The two AND blocks 84 and 86 are connected on the output side to an OR element 94 whose output is again connected to an OR element 96. The output of AND block 88 leads directly to an OR element 98.

OR elements 96 and 98 ensure that the exemplary method described in FIG. 4 is performed for all the cylinders 1 through i of internal combustion engine 10. The output of OR element 96 leads to an alarm block 100, and the output of OR element 98 to a second alarm block 102.

If both bits $B_1$ and $B_2$ are equal to zero (capacitative element 32 and ohmic resistance 34 are each working correctly), a bit =0 is also present at the respective outputs of AND blocks 84, 86, and 88, so that ultimately neither alarm block 100 nor alarm block 102 is activated. If, however, bit $B_1=1$ (ohmic resistance 34 is defective), and bit $B_2=0$ (capacitative element 32 is working correctly), this results in a bit=1 at the output of AND block 86, so that ultimately alarm block 100 is activated.

The same also applies to the case in which bit $B_1=0$ (ohmic resistance 34 is working correctly), but bit $B_2=1$ (capacitative element 32 is defective). In this case a logical value of 1 is present at the output of AND block 84, once again ultimately resulting, via OR element 94, in the activation of alarm block 100. Lastly, if bit $B_1$=1 (ohmic resistance 34 is defective) and bit $B_2$=1 (capacitative element 32 is defective), this then results in a bit=1 at the output of AND block 88, which ultimately causes the activation of alarm block 102.

Alarm block 100 causes an input into a fault memory and the illumination of a warning light. In addition, the maximum torque that may be generated by internal combustion engine 10 is reduced. Upon activation of alarm block 102, on the other hand, the affected cylinder is shut down, fuel pressure is reduced and, if applicable, the entire internal combustion engine 10 is shut down. The exemplary method depicted in FIG. 4 thus permits a graduated reaction, depending on whether only piezo positioner 32 or only ohmic resistance 34, or both piezo positioner 32 and ohmic resistance 34 simultaneously, are defective.

What is claimed is:

1. A method for operating an actuator having a capacitative element, an ohmic resistance connected in parallel with the capacitative element, and a value of the ohmic resistance configured to be sensed at specific points in time, the method comprising:

monitoring a correct functioning of the ohmic resistance; and outputting a fault signal upon detection of a malfunction.

2. The method of claim 1 further comprising:

comparing the sensed value of the ohmic resistance with a predetermined limit value.

3. The method of claim 2, wherein the value of the ohmic resistance is sensed at least one of during a startup phase of a control unit with which the capacitative element is activated and during a shutdown phase of the control unit when the control unit is being switched off.

4. The method of claim 2, wherein the capacitative element is used in an injector of an internal combustion engine, and the value of the ohmic resistance is sensed during a coasting mode of the internal combustion engine.

5. The method of claim 1, further comprising:

monitoring a correct functioning of the capacitative element.

6. The method of claim 5, further comprising:

outputting a first fault signal one of:

if it is determined that the ohmic resistance is functioning correctly and the capacitative element is not functioning correctly; and if it is determined that the capacitative element is functioning correctly and the ohmic resistance is not functioning correctly.

7. The method of claim 6, wherein the capacitative element is used in an injector of an internal combustion engine, and the first fault signal causes a reduction in the maximum permitted torque of the internal combustion engine.

8. The method of claim 6, further comprising:

outputting a second fault signal if it is determined that the ohmic resistance and the capacitative element are not functioning correctly.

9. The method of claim 8, wherein the capacitative element is used in an injector of an internal combustion engine, and the second fault signal causes at least one of an affected cylinder to be shut off, a fuel pressure to be reduced, and the internal combustion engine to be shut down.

10. The method of claim 8, wherein at least one of the first fault signal and the second fault signal results in at least one of an input into a fault memory and a triggering of an alarm signal.

11. A computer-readable storage medium for storing a computer program that is executable on a computer and controlling a method to operate an actuator having a capacitative element, an ohmic resistance connected in parallel with the capacitative element, and a value of the ohmic resistance configured to be sensed at specific points in time, the method comprising:

monitoring a correct functioning of the ohmic resistance; and outputting a fault signal upon detection of a malfunction.

12. The computer program of claim 11, wherein the computer program is storable on a memory of the computer.

13. The computer program of claim 11, wherein the computer program is storable on a flash memory.

14. A control unit using at least one of an open-loop control and a closed-loop control for operating a positioner having a capacitative element, an ohmic resistance connected in parallel with the capacitative element, and a value of the ohmic resistance configured to be sensed at specific points in time, comprising:

a memory to store a computer program for controlling a method to operate the positioner, the method including:

monitoring a correct functioning of the ohmic resistance; and outputting a fault signal upon detection of a malfunction.

15. An internal combustion engine, comprising:

a combustion chamber;

at least one injector including an actuator having a capacitative element and an ohmic resistance connected in parallel with the capacatative element; and a control device using at least one of an open-loop control and a closed-loop control to control the actuator, monitor a correct functioning of the ohmic resistance, and output a fault signal upon detection of a malfunction.

* * * * *